United States Patent
Krueger et al.

(10) Patent No.: US 7,789,457 B2
(45) Date of Patent: Sep. 7, 2010

(54) VEHICLE FILM COMPONENT, AND METHOD FOR THE PRODUCTION THEREOF

(75) Inventors: Jan Krueger, Stuttgart (DE); Margit Veeh, Ulm (DE)

(73) Assignee: Daimler AG, Stuttgart (DE)

( * ) Notice: Subject to any disclaimer, the term of this patent is extended or adjusted under 35 U.S.C. 154(b) by 605 days.

(21) Appl. No.: 10/592,264

(22) PCT Filed: Feb. 10, 2005

(86) PCT No.: PCT/EP2005/001344

§ 371 (c)(1), (2), (4) Date: Sep. 10, 2007

(87) PCT Pub. No.: WO2005/095189

PCT Pub. Date: Oct. 13, 2005

(65) Prior Publication Data

US 2008/0129083 A1    Jun. 5, 2008

(30) Foreign Application Priority Data

Mar. 15, 2004    (DE) ........................ 10 2004 012 467

(51) Int. Cl.
*B60N 3/00* (2006.01)

(52) U.S. Cl. .............. 296/193.05; 296/900; 296/901.01; 427/471; 428/500

(58) Field of Classification Search ................. 296/900, 296/901.01, 193.05, 193.06; 428/195, 195.1, 428/212, 411.1, 480, 482, 483, 500; 427/299, 427/322, 458, 470, 471, 532, 533, 535, 536, 427/565, 551, 558, 407.1, 412.1, 412.3, 412.5
See application file for complete search history.

(56) References Cited

U.S. PATENT DOCUMENTS

| | | | |
|---|---|---|---|
| 3,363,039 A | 1/1968 | Satoshi et al. | |
| 3,639,748 A | 2/1972 | Pearson et al. | |
| 5,009,020 A | 4/1991 | Watanabe | |
| 5,721,039 A | 2/1998 | Yanagihara et al. | |
| 5,895,115 A | 4/1999 | Parker et al. | |
| 5,912,081 A | 6/1999 | Negele et al. | |
| 6,132,662 A | 10/2000 | Preisler et al. | |
| 6,777,089 B1 | 8/2004 | Koeniger et al. | |
| 7,001,643 B1 * | 2/2006 | Blum et al. .............. | 427/412.1 |
| 2002/0105812 A1 | 8/2002 | Zimmermann et al. | |
| 2002/0135203 A1 | 9/2002 | Pommeret et al. | |
| 2004/0236019 A1 | 11/2004 | Numrich et al. | |
| 2008/0068851 A1 | 3/2008 | Waldmann | |

FOREIGN PATENT DOCUMENTS

| | | |
|---|---|---|
| DE | 1529769 A | 5/1969 |
| DE | 2835431 C3 | 11/1989 |

(Continued)

*Primary Examiner*—Lori L Lyjak
(74) *Attorney, Agent, or Firm*—Patent Central LLC; Stephan A. Pendorf

(57) ABSTRACT

A component such as a vehicle exterior part having a transparent area without creating gaps is produced by introducing a hole into a film for the transparent area, inserting the film into a component mold, and then back-molding the same with a transparent plastic material in the mold such that the hole is filled with the transparent plastic material.

10 Claims, 1 Drawing Sheet

FOREIGN PATENT DOCUMENTS

| | | |
|---|---|---|
| DE | 3138167 C2 | 3/1992 |
| DE | 4417404 A1 | 11/1994 |
| DE | 19711794 A1 | 7/1997 |
| DE | 19628966 C1 | 12/1997 |
| DE | 19753721 A1 | 6/1999 |
| DE | 19840636 C1 | 3/2000 |
| DE | 19940244 A1 | 4/2000 |
| DE | 19858183 C1 | 7/2000 |
| DE | 19917965 A1 | 10/2000 |
| DE | 20021312 U1 | 4/2001 |
| DE | 199 51 785 A1 | 5/2001 |
| DE | 199 56 930 A1 | 5/2001 |
| DE | 19951785 A1 | 5/2001 |
| DE | 10055190 A1 | 5/2002 |
| DE | 69716507 T2 | 2/2003 |
| DE | 20313996 U1 | 11/2003 |
| DE | 102 30 030 A1 | 1/2004 |
| DE | 10343259 A1 | 4/2004 |
| DE | 102004018695 A1 | 12/2005 |
| EP | 0381856 A2 | 8/1990 |
| EP | 0806274 A2 | 11/1997 |
| EP | 1431116 A2 | 6/2004 |
| GB | 2004494 A | 4/1979 |
| JP | 11038455 | 2/1999 |
| JP | 2000301985 | 10/2000 |
| JP | 2002515361 | 5/2002 |
| WO | WO 9959793 | 11/1999 |
| WO | WO00/67920 | * 11/2000 |
| WO | 0238351 A2 | 5/2002 |
| WO | 03018697 A1 | 3/2003 |
| WO | 03033275 A2 | 4/2003 |

* cited by examiner

VEHICLE FILM COMPONENT, AND METHOD FOR THE PRODUCTION THEREOF

CROSS REFERENCE TO RELATED APPLICATION

This application is a national stage of PCT/EP 2005/001344 filed Feb. 10, 2005 and based upon DE 10 2004 012 467.1 filed Mar. 15, 2004 under the International Convention.

BACKGROUND OF THE INVENTION

Field of the Invention

The invention concerns a vehicle film component and a process for production thereof. A component and a process of this generic type are already known from DE 199 56 931 A1.

SUMMARY

Recently, the use of plastic in the manufacture of external components such as for motor vehicles, in particular automobiles, has increased, since these provide advantages including weight and corrosion resistance. These types of components must have an optically pleasing surface, for which reason it is proposed for example in DE 199 56 930 A1 to produce these by back-spraying lacquer films.

A great variety of these external components require transparent areas, for example for the C-column or the rear wall with inlaid windows or the cartridge in which the emblem is secured. Such components are first produced without transparent areas and then the transparent element is joined together therewith. For example, a component is cast, an area corresponding to the contour of the transparent area is stamped out, and then a premanufactured transparent component fitting this contour is introduced into the produced opening and is clamped, screwed or adhered thereto. This manner of proceeding is expensive due to its multi-step manufacturing technique and beyond this is expensive. Beyond this, it is difficult to avoid gaps, as a result of which problems with respect to water tightness and corrosion as well as with regard to freedom of design result.

The task of the present invention thus comprises providing a component, which can be produced in a simpler manner and without gaps, as well as a corresponding process for the production thereof.

The invention, with regard to the component and the process to be provided, is described in greater detail below

BRIEF DESCRIPTION OF THE DRAWINGS

The present invention is illustrated by way of example and not limitation in the accompanying drawings in which like reference numbers indicate similar parts, and in which.

DETAILED DESCRIPTION OF THE INVENTION

Figure 1:
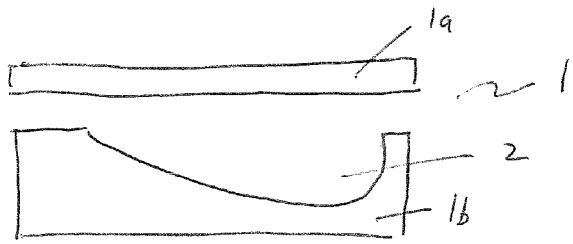
FIG. 1 shows a cross sectional view of mold parts.
Figure 2:
FIG. 2 shows a film.
Figure 3:
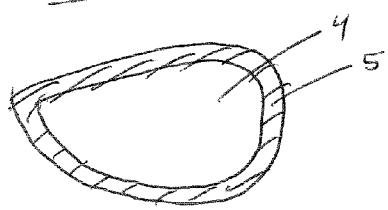
FIG. 3 shows a film with opening.
Figure 5:
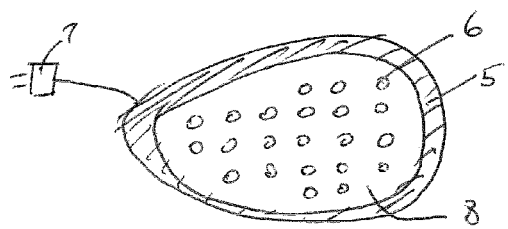
FIG. 5. is a front view of a side safety light as produced in FIG. 4.

The task with regard to the process to be provided for production of a motor vehicle component in accordance with the invention is solved by the following process steps:
  providing a component mold,
  fitting a film to the mold,
  introducing the film into the mold,
  at least partially back-molding the film in the mold with at least one plastic layer,
  wherein
  at least one opening with predetermined contour was introduced into the film prior to back-molding, and
  the back-molding of the film occurs with a transparent plastic material at least in the area of the at least one opening, in such a manner, that the opening is filled with the transparent plastic.

This process is simpler to carry out than those according to the state-of-the-art, since the shaping of the component and the introducing of the transparent area inventively require only a single step while until now multiple steps had been required.

Beyond this, the introduction of the transparent plastic behind the film in the mold requires that the plastic in the area of the hole represents an outer wall of the component, which is flush with the foil. As a consequence, no gaps occur and the therewith associated problems with regard to providing a good seal and providing freedom of design do not occur.

Further, the unitary piece provided in accordance with the invention increases the stability of the component in comparison to the prior art retroactively joined two element component.

The fitting or tailoring of the film to the mold can occur by cutting and deep drawing. Depending upon the elasticity of the film—in particular depending upon the temperature of the transparent plastic during the back-molding—and depending upon the three dimensional shape of the mold topology it may also be possible to simply dispense with deep drawing.

The hole can be introduced into the film by stamping. It is however also possible to cut with blades, or cut by water jet or laser beam.

The back-molding of the film with the plastic can occur by integral casting, in particular of a synthetic resin, or by back spraying, for example with polycarbonate.

In one special embodiment the foil is backfilled with a transparent plastic in the area of the hole, and with one or more other plastics in other areas, wherein the other plastics exhibit other mechanical, chemical or optical characteristics.

The task with regard to the component to be provided is inventively solved thereby, that it includes a lacquer or decorative film and includes a plastic layer adhering at least partially directly to the film (that is, it is not clamped or screwed or secured with supplemental adhesives), wherein the film exhibits at least one hole with a predetermined contour and wherein the plastic is transparent and constitutes an outer wall of the component in the area of the hole, such that the plastic seals flush or evenly with the film.

A component of this type exhibits the advantages already enumerated with regard to the process.

The transparent plastic can be a duromer, in more specifically a plastic resin (for example epoxy resin, polyester resin, phenol resin, melamine resin) or a thermoplast, in particular PMMA, PC, SAN, PET, PBT. These transparent plastics exhibit a sufficient spectrum of mechanical, chemical, optical and haptic characteristics to satisfy almost any desired application.

According to a preferred embodiment of the invention the plastic is electrochromic, in particular it contains polyaniline. A further suitable electrochromic plastic is polymeta-toluidine.

This type of plastics exhibits the advantage, that the color, more specifically the transparency, can be changed by application of tension. This makes it possible to close windows made of these plastics in an inventive component by activation of a push button or by application of tension.

In a further advantageous embodiment of the inventive component functional elements are embedded in the component, in particular in the transparent plastic, for example illumination elements (for example diodes). By embedding the functional elements, these are substantially protected from environmental influences, in particular both the mechanical and chemical type.

In the following the inventive process and component will be described in greater detail on the basis of an illustrative example:

According to a first embodiment a side safety lamp is produced. For this, first a suitable injection mold (1) is prepared and made available. The injection mold has a cavity (2) the approximate shape of a half of an egg.

Figure 4:
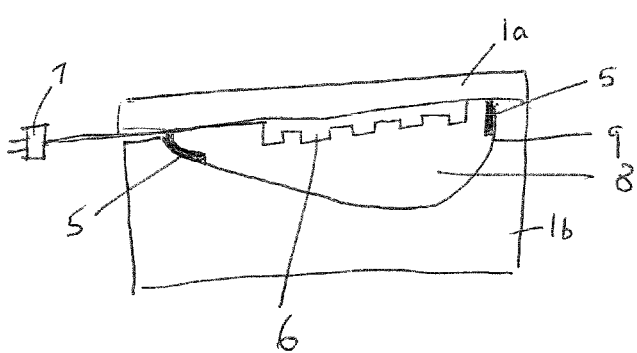
FIG. 4 shows a cross-sectional view of the mold with light emitter and film arranged inside during casting.
Figure 6:
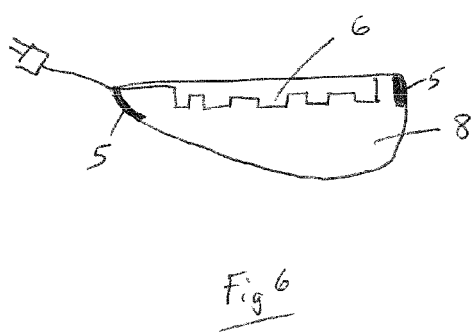
FIG. 6 is a side cross-sectional view of the side safety light of FIG. 5.

A black film (3) is tailored in such a manner that its outer dimension corresponds to the longitudinal diameter of the injection mold. Then, on its inside, an egg shaped hole (4) is stamped, so that an egg-shaped ring (5) remains, which is introduced into the injection mold as shown in FIG. 4.

Besides this, functional means—here multiple light emitting diodes (6) with their associated connectors (7)—are introduced into the injection mold (1) which is closed by bringing together mold parts (1a, 1b).

Thereafter the lacquer film in the closed spray mold is back filled with hot, liquid, transparent polycarbonate (8), in such a manner, that the hole is filled with the transparent polycarbonate.

The introduction of the hot polycarbonate subsequent to the film (3) in the form of an egg-shaped ring (5) warms this and increases its elasticity, so that it can completely conform to the contour of the mold. The rest of the mold hollow space (2), in particular the hole (4) in the film, is completely filled in by the liquid polycarbonate (8), in such a manner, that the polycarbonate after cooling in the area of the hole provides a stable transparent outer wall (9) of the component, which seals or is flush with the film (5). As a result, no gaps are produced, and accordingly, there can be no problems associated with water tightness and design. Otherwise, the inventive provided unitary nature increases the stability of the component relative to a retroactively produced joined component.

By the embedding, the diodes (7) serving as illumination means are substantially protected from environmental influences, in particular of the mechanical and chemical type.

By the embedding, the diodes serving as illumination means are substantially protected from environmental influences, in particular of the mechanical and chemical type.

The inventive process and component exhibit in the embodiment of the above described example a particular suitability for the manufacture of motor vehicle film components, which contain transparent areas, in particular for such components which are required in the automobile industry.

On the one hand, substantial advantages can be achieved thereby with regard to process time. However, also the corrosion protection and the freedom of design can be improved by the unitary nature.

The invention is not limited to the above described illustrative embodiment, but rather is broadly applicable.

Thus it is conceivable for example that the film itself is transparent, however, exhibits other shades or has other mechanical or chemical characteristics than the transparent plastic.

The invention claimed is:

1. A process for producing a vehicle component including the steps:
   (a) providing a component mold (1),
   (b) providing a film (5) having an inner surface, an outer surface, and a minimum thickness, and adapted to fit the mold and having at least one opening (4) with predetermined contour,
   (c) introducing the film into the mold,
   (d) at least partially back-molding the film in the mold with at least one transparent plastic material (8) at least in the area of the at least one opening (4) in such a manner that the opening is filled with the transparent plastic.

2. A motor vehicle unitary component (10) having an outer wall (9) and including:
   a decorative film (5), the film having an inner surface, an outer surface, and a minimum thickness, and exhibiting as least one opening (4) with predetermined contour,
   a plastic layer (8) adhered at least partially directly to the film, wherein the plastic is transparent and, in the area of the opening (4), constitutes the outer wall (9) of the component (10), such that the outer wall of the plastic layer is flush with the outer surface of the film (5) and seals the opening (4) in the film.

3. A motor vehicle unitary component according to claim 2, wherein the plastic is a duromer or a thermoplast.

4. A motor vehicle unitary component according to claim 3, wherein the duromer is a synthetic resin.

5. A motor vehicle unitary component according to claim 3, wherein the thermoplast is selected from the group consisting of PMMA, PC and SAN.

6. A motor vehicle unitary component according to claim 2, wherein the plastic is electrochromic.

7. A motor vehicle unitary component according to claim 2, wherein the electrochromic plastic contains polyaniline.

8. A motor vehicle unitary component according to claim 2, wherein the unitary component includes functional elements.

9. A motor vehicle unitary component according to claim 8, wherein the functional elements are illumination means (6).

10. A motor vehicle unitary component (10) having an outer wall (9) and including:
    a decorative film (5), the film having an inner surface, an outer surface, and a minimum thickness, and exhibiting as least one opening (4) with predetermined contour,
    a plastic layer (8) adhered at least partially directly to the film, wherein the plastic is transparent and, in the area of the opening (4), constitutes the outer wall (9) of the component (10), such that the outer wall of the plastic layer is flush with the outer surface of the film (5) and seals the opening (4) in the film, and
    at least one light emitting functional element embedded in said plastic layer (8).

* * * * *